US005271832A

United States Patent [19]

Schreiber

[11] Patent Number: 5,271,832

[45] Date of Patent: Dec. 21, 1993

[54] ACTIVATION PLANT WITH FUNNEL-SHAPED SECONDARY SEDIMENTATION

[75] Inventor: Berthold Schreiber, Hanover, Fed. Rep. of Germany

[73] Assignee: Erhard Schreiber, Langenhagen, Fed. Rep. of Germany; a part interest

[21] Appl. No.: 778,321

[22] Filed: Oct. 17, 1991

[30] Foreign Application Priority Data

Oct. 18, 1990 [DE] Fed. Rep. of Germany ....... 4033038

[51] Int. Cl.[5] ........................ B01D 21/02; B01D 21/28

[52] U.S. Cl. ................................ 210/195.3; 210/197; 210/220; 210/221.1; 210/256; 210/520; 210/525; 210/530

[58] Field of Search ..................... 210/195.3, 197, 220, 210/221.1, 205, 236, 256, 520, 530, 525, 926

[56] References Cited

U.S. PATENT DOCUMENTS

| | | | |
|---|---|---|---|
| Re. 21,109 | 6/1939 | Sayers | 210/530 |
| 2,073,810 | 3/1937 | Sayers | 210/530 |
| 2,647,869 | 8/1953 | Kelly | 210/530 |
| 2,649,412 | 8/1953 | Kivari . | |
| 2,901,114 | 8/1959 | Smith . | |
| 3,353,677 | 11/1967 | Thayer | 210/256 |
| 3,396,102 | 8/1968 | Forrest . | |
| 3,415,379 | 9/1968 | Thayer | 210/256 |
| 3,448,861 | 6/1969 | Berk | 210/256 |
| 3,487,017 | 12/1969 | Thorn | 210/530 |
| 3,495,712 | 6/1967 | Schreiber | 210/256 |
| 3,533,508 | 10/1970 | Seipp | 210/256 |
| 3,534,857 | 10/1970 | Berk | 210/256 |
| 3,595,783 | 7/1971 | Pflanz | 210/256 |
| 3,599,794 | 8/1971 | Schreiber | 210/256 |
| 3,733,263 | 5/1973 | Mandt | 210/256 |
| 3,744,634 | 7/1973 | Schlenz | 210/256 |
| 3,857,910 | 12/1974 | Day | 210/220 |
| 3,993,568 | 11/1976 | Fux | 210/530 |
| 4,142,977 | 3/1979 | Le Fur | 210/530 |
| 4,272,369 | 6/1981 | Love | 210/530 |
| 4,364,834 | 12/1982 | Wawro | 210/530 |
| 4,687,576 | 8/1987 | Hardison | 210/256 |

FOREIGN PATENT DOCUMENTS

| | | |
|---|---|---|
| 1784469 | 11/1970 | Fed. Rep. of Germany . |
| 2757860 | 6/1979 | Fed. Rep. of Germany . |

*Primary Examiner*—Thomas M. Lithgow
*Attorney, Agent, or Firm*—Bell, Seltzer, Park & Gibson

[57] ABSTRACT

An activation plant for the treatment of waste water by the activated sludge method is disclosed wherein the plant has an outer, annular activation tank, a concentric, inner, funnel shaped secondary sedimentation tank, and a rotating aeration bridge rotating about the central axis. The return sludge, excess sludge, and floating sludge chambers, and the associated pumps, are provided in a central shaft that is the central axis for the concentric tanks. The floating sludge chamber is supplied by an annular trough circumscribing the central shaft. Clean water is removed through a conduit in the central shaft. The central shaft, chambers, and aeration bridge are supported by at least three rectangular tubes that are mounted on the wall of the secondary sedimentation tank and extend radially from the conduit for clean water in the central shaft. The rectangular tubes provide a flow space for clean water from the activation plant and are connected to outlet troughs for collecting the clean water. Roof shaped downflow baffle hoods are provided against floating sludge in the outlet troughs.

18 Claims, 4 Drawing Sheets

ACTIVATION PLANT WITH FUNNEL-SHAPED SECONDARY SEDIMENTATION

FIELD OF THE INVENTION

This invention relates to waste water treatment using the activated sludge process. More specifically, this invention relates to activation plants having an annular activation tank and a concentric funnel-shaped secondary sedimentation tank.

Activation plants which, in a round configuration, combine an outer activation tank, annular in outline, with an inner, funnel-shaped secondary sedimentation tank are known. Arranged over this round tank is a circulating aeration bridge, which can travel on the outer activation tank wall and is rotatably mounted at the central axis of the secondary sedimentation tank on a central shaft. The aeration bridge bear in the region of the activation tank aerator pipes, which are arranged just above the floor of said tank and are supplied with compressed air via corresponding compressed air lines from blowers, which are fitted either outside the activation plane or on the aeration bridge. The central shaft has a circular outline, is open at top and bottom and extends on a level with the upper third of the secondary sedimentation tank. This central shaft is in turn supported by corresponding supports on the funnel-shaped floor of the secondary sedimentation tank.

The secondary sedimentation tank is charged with an activated sludge/water mixture from the activation tank via a horizontal pipe, which leads from the activation tank into the central shaft of the secondary sedimentation tank. The activated sludge/water mixture leaves from the bottom of the central shaft in a smooth, slow flow, is diverted half-way up the secondary sedimentation tank and then rises to the surface of the secondary sedimentation tank, where it flows on the inner side of the secondary sedimentation tank outer wall over a sill into an outlet trough arranged over the entire circumference of the secondary sedimentation tank. From a point of the outlet trough, an outlet pipe leads the purified water out of the activation plant.

The outlet trough is formed by the inner side of the secondary sedimentation tank outer wall, a concrete bracket extending from the outer wall inward into the secondary sedimentation tank and the sill fastened vertically to said bracket. In order not to allow floating sludge on the surface of the water of the secondary sedimentation tank to reach the outlet, a downflow baffle has to be arranged ahead of the sill of the outlet trough. The floating sludge held back by the downflow baffle has to be pumped off by the sewage works operator every day in a very laborious operation, by lowering a submersible floating sludge pump just below the water level of the secondary sedimentation tank.

During the slow vertical flow through the secondary sedimentation tank, the activated sludge/water mixture separates the sludge sinks down into the end of the funnel and the clean water and floating sludge rise to the surface of the water and, as described above, are removed from the secondary sedimentation tank. The sludge which has sunk into the end of the funnel flows in free fall into a return and excess sludge pumping works, arranged outside the activation plant, from where a return pump pumps back most of the sludge continuously as return sludge via a corresponding line into the activation tank and an excess sludge pump pumps the daily occurring excess sludge via a corresponding line into a sludge silo.

The activation plant described above, constructed thus far in the conventional manner, has several disadvantages adding to the costs of construction and operation.

The central shaft of the secondary sedimentation tank, which is erected as a vertical cylinder of concrete or steel which is open at top and bottom and at the same time serves as a supporting structure for the central swivel bearing of the circulating aeration bridge, can be produced in the funnel-shaped secondary sedimentation tank and supported in the deep end of the funnel by corresponding supports only with considerable effort. The outlet trough can be produced on the inner side of the secondary sedimentation tank outer wall only with considerable effort, since the framework for concreting the round outer wall has to be interrupted for concreting on a bracket for the bottom of the outlet trough. The bracket itself has to be connected to the outer wall by corresponding reinforcing bars and its own framework. Furthermore, the sill and the downflow baffle of steel can likewise only be fitted with great effort, only by means of frameworks which have to extend over the entire circumference of the secondary sedimentation tank outer wall and into the end of the funnel Great effort is likewise required for designing and operating the floating sludge elimination. To eliminate the floating sludge, the sewage works operator has to stop the circulating aeration bridge. climb onto it and, while over the secondary sedimentation tank, lower the floating sludge pump into the water by means of a winch and then switch on the pump until the floating sludge has been sucked off in this area of the surface of the secondary sedimentation tank. Then the pump has to be lifted out of the water again, the bridge moved on a little and then a further sector of the circular water surface of the secondary sedimentation tank cleared of floating sludge again in the way described above Even more effort is involved in constructing a separate pumping works, to be set up outside the activation plant, for the return and excess sludge with the corresponding connecting pipelines.

The object of the invention is to provide an activation plant of the generic type defined at the beginning for which the production effort and fixed operating costs can be reduced considerably in comparison with the previously customary designs.

SUMMARY OF THE INVENTION

This invention provides a central shaft arranged at the central axis of the secondary sedimentation tank that is a supporting structure for the circulating aeration bridge and contains a return and excess sludge chamber and is supported by at least three radially arranged supporting arms, which lie under the water level of the secondary sedimentation tank and are mounted on the secondary sedimentation tank wall.

Further features, advantageously developing the subject of the invention, are specified in the subclaims.

Along with the previous function as central bearing for the circulating aeration bridge, the central shaft of steel is also given the tasks involved in integration of a return and excess sludge chamber, a floating sludge chamber and the associated three pumps for return, excess and floating sludge. There is no need to set up a separate return and excess sludge pump works outside the activation plant, with correspondingly more complex line routing.

The floating sludge elimination described at the beginning, which is complex to set up and can only be operated manually, is replaced by a construction which entails far lower production costs and can be operated automatically without the presence of the sewage works operator.

The outlet troughs of the previous, complex combined configuration, having a reinforced concrete bracket as outlet trough bottom, with a bottom which has to be provided with tiles for aesthetic reasons and has to be cleaned repeatedly by hand, only with even greater risk of accidents, owing to the formation of algae caused by sunlight, and having the downflow baffle, which can be fitted only with laborious effort, are replaced by outlet troughs which are simply integrated into the supporting arms, are covered by downflow baffle hoods and therefore do not have to be tiled or cleaned.

The central shaft need not be supported in the deep end of the funnel of the secondary sedimentation tank. Rather, the loads from the aeration bridge and from the central shaft are diverted via the supporting arms 7 to the upper edge of the secondary sedimentation tank outer wall.

The entire steel construction, containing the return and excess sludge chamber including the two associated pumps, the floating sludge chamber including the associated pump, the outlet troughs and the downflow baffle hoods, is produced at the factory completely as a single construction and, at the site, is simply suspended in the secondary sedimentation tank by means of a mobile crane and fastened. This reduces the overall production and assembly times to a significant extent and, due to the additionally lower material consumption, lowers the overall building costs to a still greater extent.

DETAILED DESCRIPTION OF THE PREFERRED EMBODIMENTS

Figure 1:
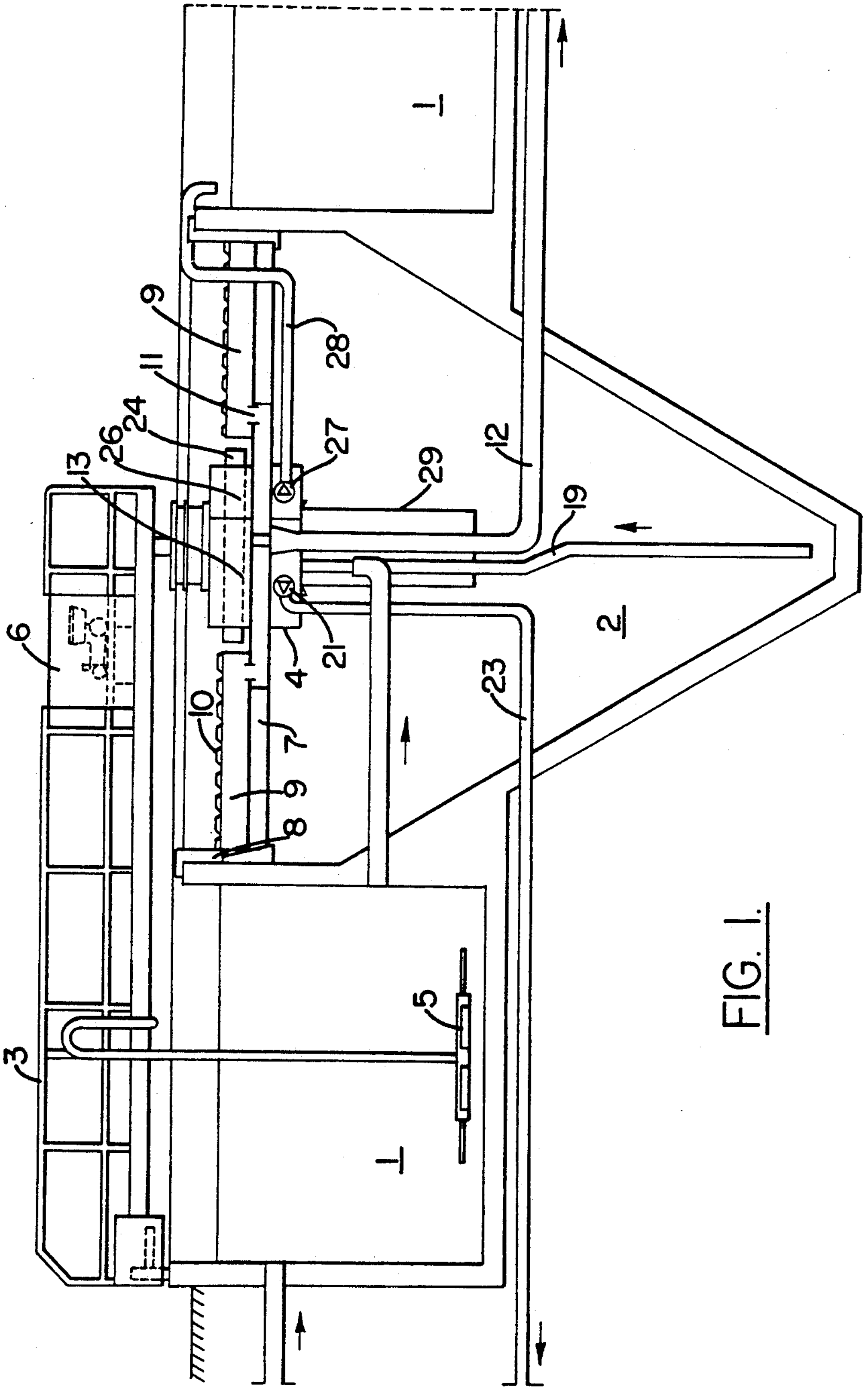
FIG. 1 represents in cross section a side view of activation plant of the invention.
Figure 2:
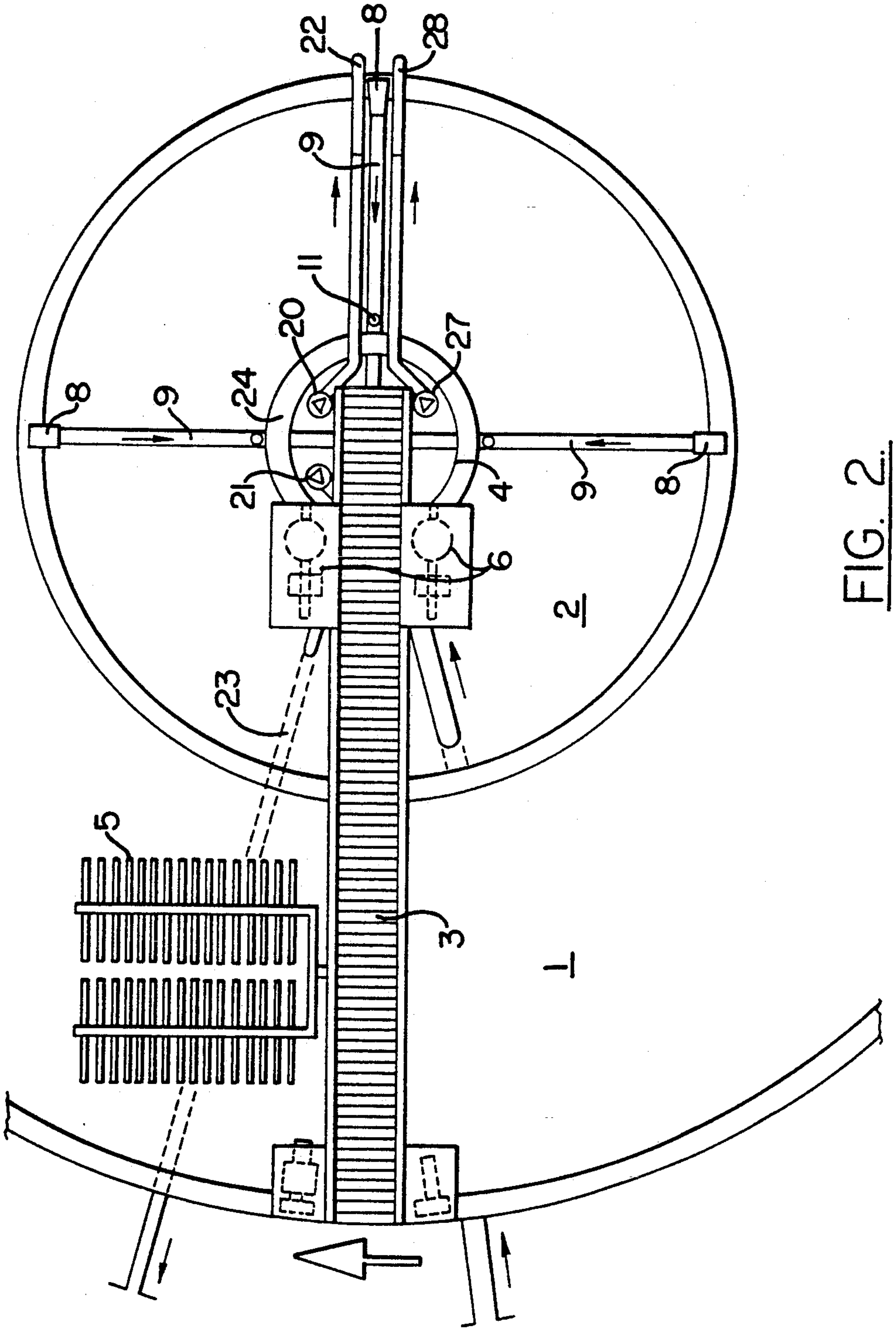
FIG. 2 represents a top plan view of the activation plant of the invention.

In order to avoid the disadvantages, the activation plant described below and represented in FIGS. 1–5 has been developed. This activation plant includes, in a round configuration, an outer activation tank 1, annular in outline, with an inner, funnel-shaped secondary sedimentation tank 2. Arranged over this round tank is a circulating aeration bridge 3, which can travel on the outer activation tank wall and is rotatably mounted at the central axis of the secondary sedimentation tank on a circular central shaft 4. The aeration bridge bears, in the region of the activation tank, aerator pipes 5, which are arranged just above the floor of said tank and are supplied with compressed air via corresponding compressed air lines from blowers 6, which are fitted either outside the activation plant or on the aeration bridge.

The central shaft 4 is produced from sheet steel and is supported by at least three horizontal supporting arms 7, which lie under the water level of the secondary sedimentation tank and lead up to the outer wall of the secondary sedimentation tank. These supporting arms preferably comprise rectangular tubes and, passing through the central shaft, are fastened to a retaining structure 8, which reaches from the upper edge of the secondary sedimentation tank wall—on which it is fastened—to below the water level, on a level with the horizontal supporting arms 7. These supporting arms serve at the same time as the underlying structure and bottom of the outlet troughs 9, which are formed by vertical plates 10 being screwed onto the rectangular tubes of the supporting arms on both sides and extending over their entire length, which plates extend above the water level and their notches 10*a*, provided over the entire length of the upper edge, extend to slightly below the water level and consequently form sills for the outlet of water from the secondary sedimentation tank. The water from the secondary sedimentation tank then flows into the outlet troughs 9 formed in this way up to the opening 11, through the latter into the rectangular tubes of the supporting arms 7 and leaves the secondary sedimentation tank, and consequently the entire activation plant, via the outlet line 12.

Figure 3:
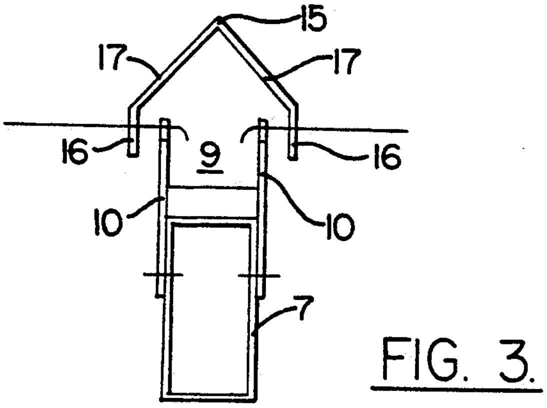
FIG. 3 represents a transverse cross section through a portion of the activation plant of the invention.
Figure 4:
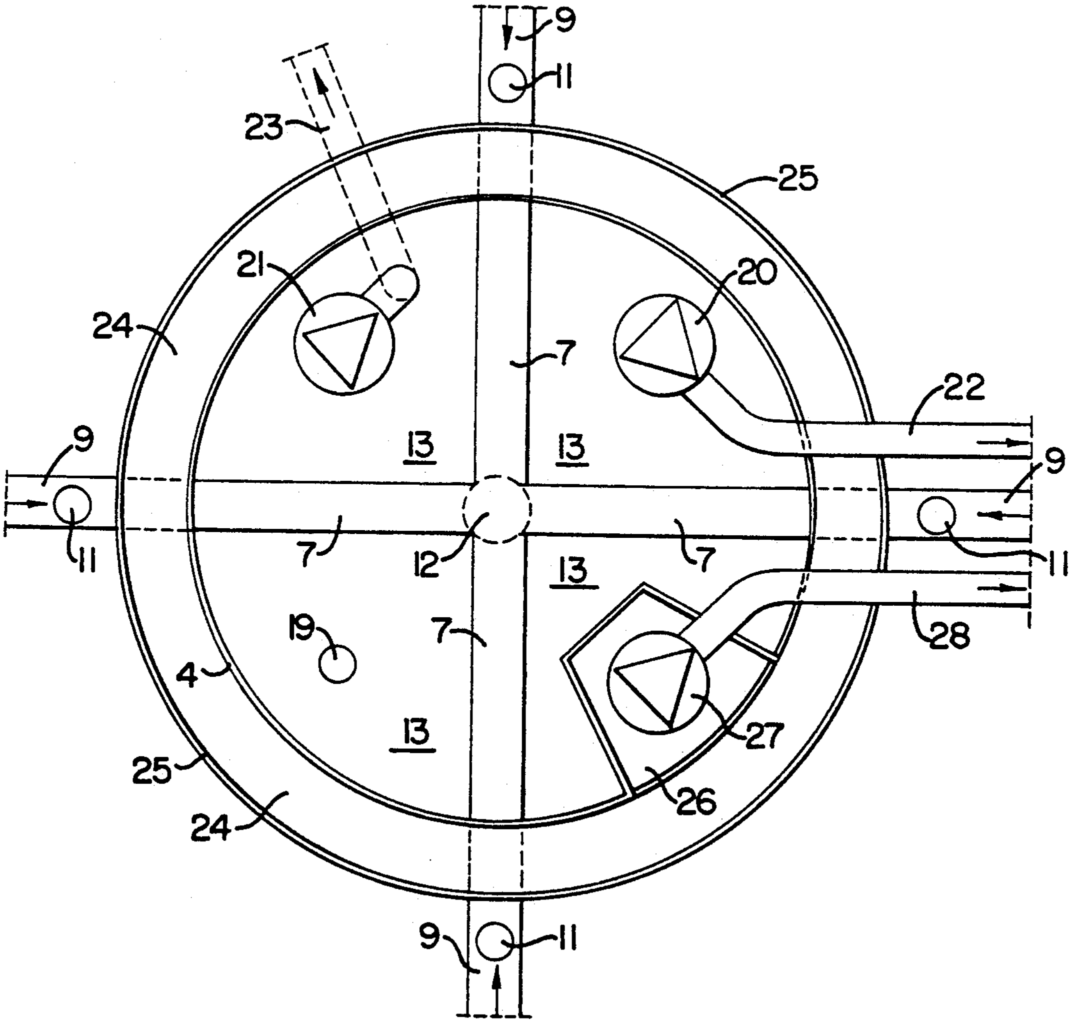
FIG. 4 represents a top plan view of a portion of the activation plant of the invention.
Figure 5:
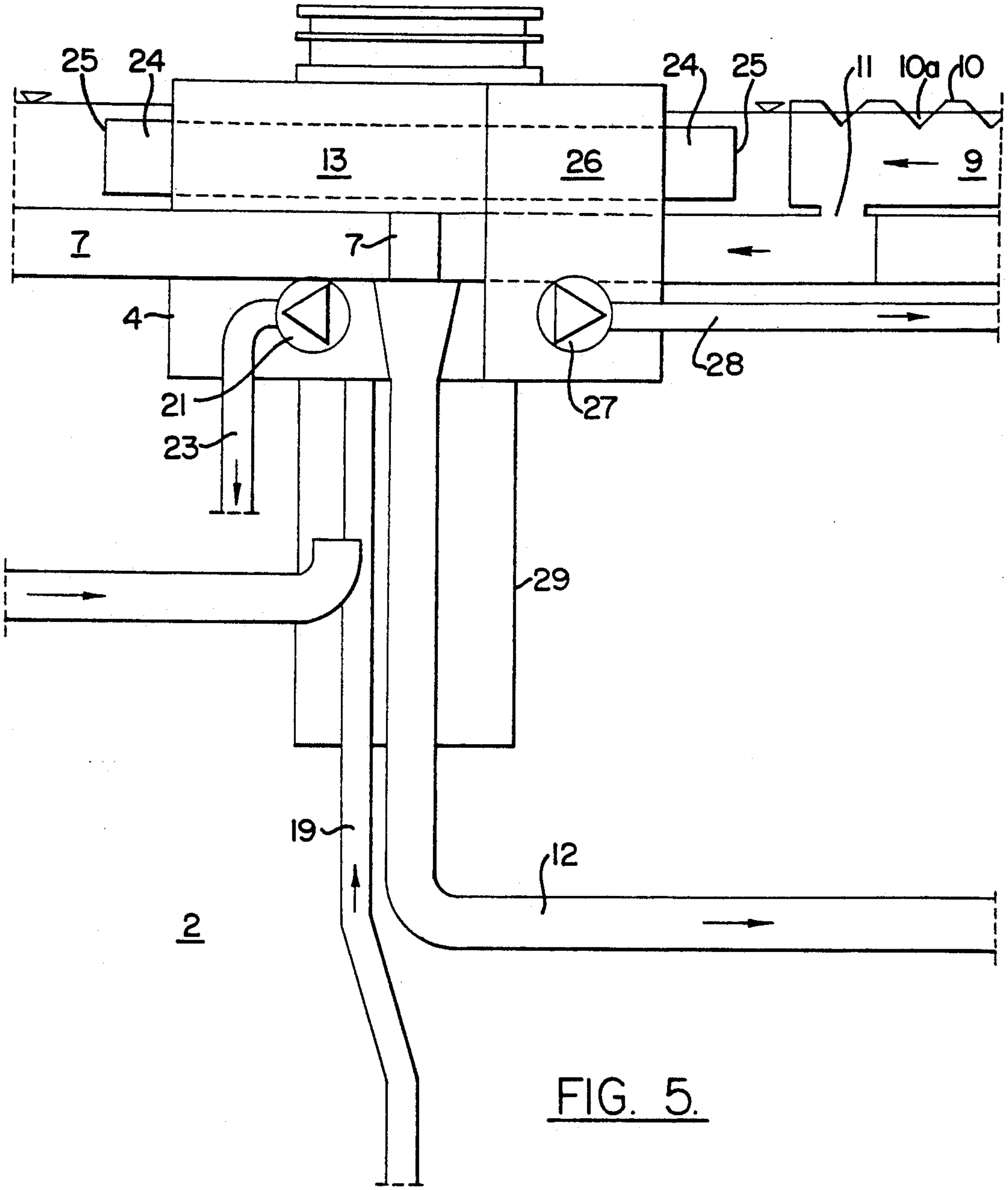
FIG. 5 represents a side view of the portion of the activation plant represented in FIG. 4.

In order for the floating sludge to be kept away from the outlet troughs, according to FIG. 3 symmetrical floating sludge hoods 15 are arranged above the outlet troughs over their entire length. The floating sludge hoods comprise two vertical plates 16, which extend into the water, at a small distance from the right-hand sill and left-hand sill and are connected to each other in a roof-shaped manner by means of oppositely sloping plates 17.

The central shaft 4 is divided into a return and excess sludge chamber 13 and a floating sludge chamber 26. The return and excess sludge chamber 13 is connected by a vertical pipeline 19 to the end of the funnel of the secondary sedimentation tank and is equipped with a submersible pump for the return sludge 20 and a submersible pump for the excess sludge 21. The return sludge pump pumps the return sludge via the pipeline 22 directly into the activation tank and the excess sludge pump pumps the excess sludge via the pipeline 23 into the sludge silo. The two pumps are each controlled by a separate timing mechanism, which can be set according to requirements.

Arranged around the central shaft is an annular trough 24, the outer vertical wall 25 of which ends about 1 to 5 cm below the water level of the secondary sedimentation tank and serves as a floating sludge sill. This trough is flooded in normal operation and is connected to a chamber 26, which extends into the chamber 13. In the chamber 26 there is a submersible pump 27 for floating sludge elimination, the pressure lines 28 of which lead into the activation tank and/or into the sludge silo.

Floating sludge elimination is automated as follows by means of an adjustable timing mechanism for the floating sludge pump; according to requirements, once a day or one or more times a week, the floating sludge pump is switched on by means of the timing mechanism. Since the partition wall of the floating sludge annular trough lies about 1 to 5 cm below the water level of the secondary sedimentation tank, the floating sludge pump sucks water off from the entire surface of the secondary sedimentation tank and consequently draws the floating sludge into the floating sludge annular trough 24 and chamber 26. Once the water level of the secondary sedimentation tank has dropped to the upper edge of the outer wall 25 of the annular trough 24, the floating sludge trough 24 and chamber 26 are emptied and consequently the entire floating sludge pumped off. The floating sludge pump is then switched off by means of a level switch mechanism in the floating sludge chamber.

The round shaft 29 is the inlet shaft for the secondary sedimentation tank and is fastened to the central shaft.

What is claimed is:

1. An activation plant for the treatment of waste water by the activated sludge process, said activation plant comprising:

(a) an annular activation tank for containing activated sludge and waste water, said annular activation tank having a first outer wall and a bottom surface;

(b) a funnel-shaped secondary sedimentation tank having an upper portion and a lower portion defining a second wall concentrically located inwardly of said annular activation tank, said secondary sedimentation tank including means for receiving activated sludge and waste water from said activation tank and separating sludge from treated waste water;

(c) a central shaft located inside of the secondary semimentation tank and defining a common central axis for said activation tank and said secondary sedimentation tank;

(d) a chamber means within said central shaft including means for returning sludge to said activation tank and for removing excess sludge from said activation plant;

(e) an aeration bridge rotatably mounted upon said central shaft and extending over said secondary sedimentation tank to said outer wall of said activation tank for circulating over said activation tank and said secondary sedimentation tank;

(f) one or more aerator means adjacent said bottom surface of said activation tank and extending from said aeration bridge for supplying oxygen containing gas to said activated sludge; and (g) support means for supporting said central shaft, said chamber, and the end of the bridge that is mounted to said central shaft, said support means suspending said central shaft from the upper portion of said second wall and comprising at least three supporting arms extending radially from the central shaft to the second wall and mounted upon said upper portion of said second wall.

2. The activation plant of claim 1 wherein said central shaft includes an outer wall substantially circular in cross section, a portion of said outer wall extending radially inwardly along a portion of the circumference of said outer wall to define another chamber means for removal of floating sludge from said secondary sedimentation tank.

3. The activation plant of claim 1 further comprising a conduit means located in the interior of said central shaft for removing treated waste water from said activation plant, and wherein said supporting arms comprise rectangular tubes for transferring treated waste water to said conduit means, said activation plant further comprising outlet troughs extending radially above said rectangular tubes for transferring treated waste water to said rectangular tubes, said outlet troughs including notched vertical side walls attached to said rectangular tubes and extending upwardly therefrom, said rectangular tubes thereby comprising bottom surfaces of said outlet troughs, said vertical side walls extending from said rectangular tubes sufficiently to form sills for the transfer of water from said secondary sedimentation tank to said rectangular tubes.

4. The activation plant of claim 3 further comprising downflow baffle hoods disposed above said outlet troughs and extending vertically downwardly adjacent said outlet troughs for substantially precluding floating sludge from entering said outlet troughs, said downflow baffle hoods comprising first and second vertical plates extending vertically downwardly adjacent said outlet troughs and proximate thereto, and first and second sloping plate joined at one end thereof and connected at their opposite ends to said first and second vertical plates, respectively, in a roof-shaped manner.

5. An activation plant for the treatment of waste water by the activated sludge process, said activation plant comprising:

(a) an annular activation tank for containing activated sludge, said annular activation tank having a first outer wall and a bottom surface;

(b) a funnel-shaped secondary sedimentation tank defining a second wall concentrically located inwardly of said annular activation tank including means for receiving activated sludge from said activation tank and separating sludge from treated waste water;

(c) a central shaft located inside of the secondary semimentation tank and defining a common central axis for said activation tank and said secondary sedimentation tank;

(d) a first chamber means defined by and located inside of said central shaft including means for removing floating sludge from said secondary sedimentation tank;

(e) a second chamber means defined by and located inside of said central shaft including means for returning sludge to said activation tank and for removing excess sludge from said activation plant;

(f) an aeration bridge rotatably mounted upon said central shaft and extending over said secondary sedimentation tank to said outer wall of said activation tank for circulating over said activation tank and said secondary sedimentation tank;

(g) one or more aerator means adjacent said bottom surface of said activation tank and extending from said aeration bridge for supplying oxygen containing gas to said activated sludge; and (h) at least three supporting arms extending radially from said central shaft to said second wall of said secondary sedimentation tank and mounted upon said second wall for supporting said central shaft, said first and second chambers, and said aeration bridge.

6. The activation plant of claim 5 wherein said first chamber contains a first pump for removing floating sludge from said secondary sedimentation tank, said first pump including means for activating said first pump in responds to time and in response to the level of waste waster in said secondary sedimentation tank, and wherein said second chamber contains a second pump for sludge return to said annular activation tank and a third group for removing excess sludge from said activation plant.

7. The activation plant of claim 5 wherein said central shaft has an outer wall substantially circular in cross section, a portion of said outer wall extending radially inwardly along a portion of the circumference of said outer wall to define said first chamber means for floating sludge, said activation plant further comprising an annular trough circumscribing said central shaft and said first chamber means, said annular trough having an outer vertical wall defining a sill for floating sludge, said through supplying floating sludge and waste water to said first chamber means for removal of floating sludge from said secondary sedimentation tank.

8. An activation plant for the treatment of waste water by the activated sludge process, said activation plant comprising:

(a) an annular activation tank for containing activated sludge and waste water, said annular activation tank having a first outer wall and a bottom surface;

(b) a funnel-shaped secondary sedimentation tank defining a second wall concentrically located inwardly of said annular activation tank including means for receiving activated sludge from said activation tank and separating sludge from treated waste water;

(c) a central shaft defining a common central axis for said activation tank and second secondary sedimentation tank;

(d) a chamber means within said central shaft including means for returning sludge to said activation tank and for removing excess sludge from said activation plant;

(e) an aeration bridge rotatably mounted upon said central shaft and extending over said secondary sedimentation tank to said outer wall of said activation tank for circulating over said activation tank and said secondary sedimentation tank;

(f) one or more aerator means adjacent said bottom surface of said activation tank and extending from said aeration bridge for supplying oxygen containing gas to said activated sludge;

(g) at least three supporting arms extending radially from said central shaft, to said second wall of said secondary sedimentation tank and mounted upon said second wall for supporting said central shaft, said chamber, and said aeration bridge; and (h) means for removing treated waste water from the activation plant comprising outlet trough means including means attached to and extending above each of said supporting arms;

9. The activation plant of claim 8 further comprising downflow baffle hoods disposed above each of said outlet trough means and extending vertically downwardly adjacent said outlet through means for substantially precluding floating sludge from entering said outlet trough means.

10. The activation plant of claim 9 wherein said downflow baffle hoods comprise first and second vertical plates extending vertically downward adjacent said outlet trough means and proximate thereto, and first and second sloping plates joined at one end thereof and connected at their opposite ends to said first and second vertical plates, respectively, in a roof-shaped manner.

11. The activation plant of claim 9 wherein said central shaft, supporting arms, outlet through means and downflow baffle hoods comprise a prefabricated unit for suspending in said secondary sedimentation tank.

12. The activation plant of claim 8 wherein said supporting arms are horizontal and said activation plant further comprises means for mounting said supporting arms on said second wall, said means extending from the uppermost edge portion of said second wall to the level of said supporting arms for maintaining said supporting arms below the level of water in said secondary sedimentation tank.

13. The activation plant of claim 8 wherein each of said outlet through means for the outlet of water from said secondary sedimentation tank includes vertical side walls attached to their respective supporting arms and extending upwardly therefrom, said supporting arms thereby comprising bottom surfaces of said outlet trough means, said vertical side walls extending from said supporting arms sufficiently to form sills for the outlet of water from said secondary sedimentation tank.

14. The activation plant of claim 13 wherein said means for removing treated waste water from the activation plant further comprises a conduit located in the interior of the central shaft, and wherein said supporting arms comprise rectangular tubes for the passage of treated waste water and each of said supporting arms extends radially inwardly through said central shaft to said conduit, said bottom surface of said outlet trough means including openings for the passage of water into said supporting arms for passage to said conduit.

15. An activation plant for the treatment of waste water by the activated sludge process, said activation plant comprising:

(a) an annular activation tank for containing activated sludge and waste water, said annular activation tank having a first outer wall and a bottom surface;

(b) a funnel-shaped secondary sedimentation tank defining a second wall concentrically located inwardly of said annular activation tank including means for receiving activated sludge from said activation tank and separating sludge from treated waste water;

(c) a central shaft located within said secondary semimentation tank, said central shaft being formed from steel and having an outer wall substantially circular in cross section and defining a common central axis for said activation tank and said secondary sedimentation tank, a portion of said outer wall extending radially inwardly along a portion of the circumference of said outer wall to define a first chamber means for removal of floating sludge from said secondary sedimentation tank;

(d) an annular trough circumscribing said central shaft and said first chamber, said annular trough having an outer vertical wall defining a sill for floating sludge, said through supplying floating sludge and waste water to said first chamber;

(e) a second chamber means defined by said central shaft and located within said shaft, said second chamber means including means for returning sludge to said activation tank and for removing excess sludge from said activation plant;

(f) an aeration bridge rotatably mounted upon said central shaft and extending over said secondary sedimentation tank to said outer wall of said activation tank for circulating over said activation tank and said secondary sedimentation tank;

(g) one or more aerator means adjacent said bottom surface of said activation tank and extending from said aeration bridge for supplying oxygen containing gas to said activated sludge;

(h) a conduit means located in the interior of said central shaft for removing treated waste water from said activation plant;

(i) at least three rectangular tubes extending radially from said conduit means to said second wall of said secondary sedimentation tank and mounted upon said second wall for supporting said central shaft, said first and second chamber means and said aeration bridge and for transferring treated waste water to said conduit means; and (j) outlet troughs extending radially above said rectangular tubes for transferring treated waste water to said rectangular tubes, said outlet troughs including vertical side walls attached to said rectangular tubes and extending upwardly therefrom, said rectangular tubes thereby comprising bottom surfaces of said outlet troughs, said vertical side walls extending from said rectangular tubes sufficiently to from sills for the transfer of water from said secondary sedimentation tank to said rectangular tubes.

16. The activation plant of claim 15 further comprising downflow baffle hoods disposed above said outlet troughs and extending vertically downwardly adjacent said outlet troughs for substantially precluding floating sludge from entering said outlet troughs, said downflow baffle hoods comprising first and second vertical plates extending vertically downwardly adjacent said outlet troughs and proximate thereto, and first and second sloping plates joined at one end thereof and connected at their opposite ends to said first and second vertical plates, respectively, in a roof-shaped manner.

17. The activation of claim 15 wherein said first chamber contains a first pump for removing floating sludge from said secondary sedimentation tank, said first pump including means for activating said first pump in response to time and in response to the level of waste waster in said secondary sedimentation tank, and wherein said second chamber contains a second pump for sludge return to said annular activation tank and a third pump for removing excess sludge from said activation plant.

18. The activation plant of claim 15 further comprising blowers mounted upon said aeration bridge for supplying oxygen containing gas to said aerators, and wherein said gas is air.

* * * * *

UNITED STATES PATENT AND TRADEMARK OFFICE
CERTIFICATE OF CORRECTION

PATENT NO. : 5,271,832
DATED : December 21, 1993
INVENTOR(S) : Berthold Schreiber It is certified that error appears in the above-identified patent and that said Letters Patent is hereby corrected as shown below:

Column 1, between lines 10 and 11, insert -- BACKGROUND OF THE INVENTION --.

Column 1, line 18, "bear" should be -- bears --.

Column 1, line 23, "plane" should be -- plant --.

Column 1, line 58, after "separates" insert -- : --.

Column 3, line 41, after "of" insert -- the --.

Column 3, line 54, after "the" first occurrence, insert -- initially mentioned --.

Column 6, line 14, "plate" should be -- plates --.

Column 6, line 30, "semimentation" should be -- sedimentation --.

Column 6, line 60, "responds" should be -- response --.

Column 6, line 64, "group" should be -- pump --.

UNITED STATES PATENT AND TRADEMARK OFFICE

CERTIFICATE OF CORRECTION

PATENT NO. : 5,271,832

DATED : December 21, 1993

INVENTOR(S) : Berthold Schreiber

It is certified that error appears in the above-identified patent and that said Letters Patent is hereby corrected as shown below:

Column 7, line 7, "through" should be -- trough --.

Column 7, line 23, "second" should be -- said --.

Column 7, line 50, "through" should be -- trough --.

Column 7, line 55, "downward" should be -- downwardly --.

Column 7, line 61, "through" should be -- trough --.

Column 8, line 5, "through" should be -- trough --.

Column 8, line 35, "semi-" should be -- sedi- --.

Column 8, line 48, "through" should be -- trough --.

Column 9, line 6, delete "troughs" and insert -- trough means --.

Column 9, line 6, after "above" insert --each of--.

Column 9, line 8, delete "troughs" and insert -- trough means --.

UNITED STATES PATENT AND TRADEMARK OFFICE
CERTIFICATE OF CORRECTION

PATENT NO. : 5,271,832

DATED : December 21, 1993

INVENTOR(S) : Berthold Schreiber

It is certified that error appears in the above-identified patent and that said Letters Patent is hereby corrected as shown below:

Column 9, line 12, delete "troughs" and insert -- trough means --.

Column 9, line 14, "from" first occurrence should be -- form --.

Column 9, line 19, delete "troughs" and insert -- trough means --.

Column 9, line 20, delete "troughs" and insert -- trough means --.

Column 9, line 21, delete "troughs" and insert -- trough means --.

Column 10, line 3, delete "troughs" and insert -- trough means --.

Column 10, line 8, after "chamber" insert -- means --.

Column 10, line 12, "waster" should be -- water --.

Column 10, line 13, after "chamber" insert -- means --.

UNITED STATES PATENT AND TRADEMARK OFFICE

CERTIFICATE OF CORRECTION

PATENT NO. : 5,271,832

DATED : December 21, 1993

INVENTOR(S) : Berthold Schreiber

It is certified that error appears in the above-indentified patent and that said Letters Patent is hereby corrected as shown below:

Column 10, line 13, after "chamber" insert -- means --.

Signed and Sealed this

Twenty-third Day of August, 1994

*Attest:*

BRUCE LEHMAN

*Attesting Officer*

*Commissioner of Patents and Trademarks*